US011115378B2

(12) United States Patent
Hoewisch et al.

(10) Patent No.: US 11,115,378 B2
(45) Date of Patent: Sep. 7, 2021

(54) TRAFFIC FLOW CONTROL USING DOMAIN NAME

(71) Applicant: Aeris Communications, Inc., San Jose, CA (US)

(72) Inventors: Ethan Hoewisch, San Jose, CA (US); Hyungho Kim, Cupertino, CA (US); Drew S. Johnson, San Jose, CA (US); David Hu, San Jose, CA (US); Dae Seong Kim, Campbell, CA (US); Michael Steven Maiten, Los Gatos, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 16/879,087

(22) Filed: May 20, 2020

(65) Prior Publication Data

US 2020/0374262 A1    Nov. 26, 2020

Related U.S. Application Data

(60) Provisional application No. 62/851,041, filed on May 21, 2019.

(51) Int. Cl.
*H04L 29/12* (2006.01)
*H04L 12/26* (2006.01)
(Continued)

(52) U.S. Cl.
CPC .......... *H04L 61/1511* (2013.01); *H04L 43/18* (2013.01); *H04M 15/66* (2013.01); *H04W 4/24* (2013.01); *H04W 12/72* (2021.01)

(58) Field of Classification Search
CPC ...... H04L 43/18; H04L 61/1511; H04W 4/24; H04W 12/72; H04M 15/66
See application file for complete search history.

(56) References Cited

U.S. PATENT DOCUMENTS 9,179,008 B2   11/2015  Goldner
9,942,252 B1    4/2018  Kondaveeti et al.
(Continued)

OTHER PUBLICATIONS

International Search Report and Written Opinion from International Application No. PCT/US20/33778 dated Oct. 5, 2020, 9 pages.
(Continued)

*Primary Examiner* — Azizul Choudhury
(74) *Attorney, Agent, or Firm* — Brundidge & Stanger, P.C.

(57) ABSTRACT

A computer-implemented system and method for automated traffic flow control using domain name for one or more devices enabled for connectivity over cellular network are disclosed. The computer-implemented method for automated traffic flow control using domain name for one or more devices enabled for connectivity includes receiving device information for the one or more devices; receiving domain name information for at least one domain name that the one or more devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

16 Claims, 8 Drawing Sheets

(51) Int. Cl.
*H04W 4/24* (2018.01)
*H04M 15/00* (2006.01)
*H04W 12/72* (2021.01)

(56) References Cited

U.S. PATENT DOCUMENTS

| | | | |
|---|---|---|---|
| 10,097,504 B2 | 10/2018 | Backholm | |
| 10,185,761 B2 | 1/2019 | Mahjoub | |
| 10,469,514 B2 | 11/2019 | Wang | |
| 2004/0228335 A1* | 11/2004 | Park | H04L 61/1511 370/352 |
| 2007/0299941 A1* | 12/2007 | Hietasarka | H04L 61/3025 709/220 |
| 2014/0181248 A1* | 6/2014 | Deutsch | H04L 49/354 709/217 |
| 2015/0188949 A1 | 7/2015 | Mahaffey | |
| 2016/0014082 A1 | 1/2016 | Bharali et al. | |
| 2018/0019968 A1 | 1/2018 | Redekop | |
| 2018/0367571 A1 | 12/2018 | Verma et al. | |
| 2019/0182211 A1* | 6/2019 | Yang | H04L 69/326 |

OTHER PUBLICATIONS

Bilge et al., Exposure: Finding Malicious DomainsUsing Passive DNS Analysis, Ndss, pp. 1-17, Feb. 6, 2011, Retrieved at https://sites.cs.ucsb.edu/~chris/research/doc/ndss11_exposure.pdf.

Antonakakis et al., Building a dynamic reputation system for DNS, USENIX security symposium, pp. 273-290, Aug. 11, 2010, Retrieved at https://www.usenix.org/legacy/event/sec10/tech/full_papers/Antonakakis.pdf.

Marchal et al., DNSSM: A large scale passive DNS security monitoring framework, 2012 IEEE Network Operations and Management Symposium, pp. 988-993, Apr. 16, 2012, Retrieved at https://hal.archives-ouvertes.fr/hal-00749243/file/dnssm.pdf.

Felegyhazi et al., On the Potential of Proactive Domain Blacklisting, LEET 10: 6-6, Apr. 27, 2010, Retrieved at https://www.usenix.org/legacy/event/leet1.

Yadav et al., Detecting algorithmically generated malicious domain names, Proceedings of the 10th ACM SIGCOMM conference on Internet measurement, pp. 48-61, Nov. 1, 2010, Retrieved at http://eprints.networks.imdea.org/67/1/Detecting_Algorithmically_Generated_Malicious_Domain_Names_-_2010_EN.pdf.

Rughani, Detecting blacklisted ip access from android phone, Indian Journal of Science and Technology 9, No. 48, Dec. 2016, trieved at https://pdfs.semanticscholar.org/9e79/38e81ec971a48aaf70fb08fbb4ff208e2ba8.pdf.

Heard et al., Filtering automated polling traffic in computer network flow data, 2014 IEEE Joint Intelligence and Security Informatics Conference, pp. 268-271, Sep. 24, 2014, Retrieved at https://spiral.imperial.ac.uk/bitstream/10044/1/54202/2/polling_paper.pdf.

\* cited by examiner

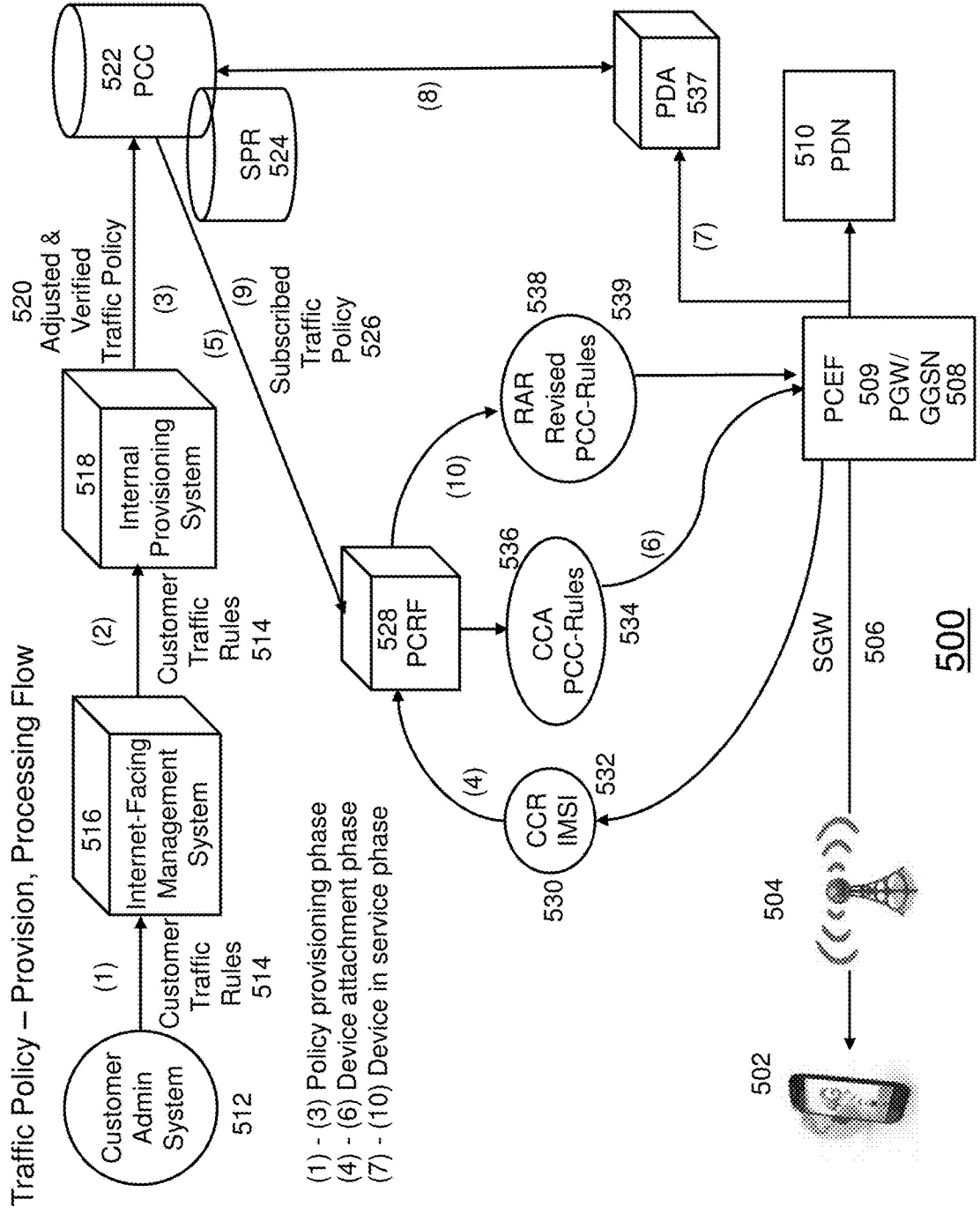

TRAFFIC FLOW CONTROL USING DOMAIN NAME

CROSS-REFERENCE TO RELATED APPLICATION

Under 35 USC 119(e), this application claims priority to U.S. provisional application No. 62/851,041, filed May 21, 2019, which is herein incorporated by reference in its entirety.

FIELD OF THE INVENTION

The present invention relates generally to controlling flow of traffic using domain names for devices using cellular or wireless connectivity.

BACKGROUND

An increasing number of devices, whether telematics equipment, sensors, tablets, phones or other types of hardware, known as machine-to-machine (M2M) or Internet of Things (IoT) devices, are enabled to connect to networks, such as wireless or cellular networks, for sending or receiving data for use with products such as Subscriber Identification Modules (SIMs). As IoT solutions are being deployed in high volume, and as concerns for the security of IoT solutions is increasing, the need and demand to limit the Internet Protocol (IP) addresses that the IoT devices can access on the network is becoming stronger. Whitelisting or blacklisting specific IP addresses is an accepted alternative for controlling access, but requires knowledge of, and continuous updating of, those addresses. Whitelisting or blacklisting a domain name, rather than specific IP addresses, may provide a simpler and better solution. However, as the IP addresses associated with a specific domain name may change over time, the possibility of errors in the application of these rules increases.

Accordingly, what is needed are systems and/or methods to address the above identified issues. The present invention addresses such a need.

SUMMARY

A computer-implemented system, method and computer program product for automated traffic flow control using domain names for one or more devices enabled for connectivity over cellular or wireless networks are disclosed. The computer-implemented method for automated traffic flow control using domain names for one or more devices enabled for connectivity over cellular or wireless networks includes receiving device information for the one or more devices; associating the device with a service profile specifying one or more domains that are allowed or disallowed for that device; receiving domain name information for at least one domain name that the one or more devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

The system for automated traffic flow control using domain name comprises one or more devices enabled for connectivity, a Policy and Charging Rules Function software node (PCRF), a service profile stored with the PCRF for devices enabled for connectivity that identifies domains that devices with that service profile are allowed to access, and a packet data analyzer, wherein the PCRF receives: device information for the one or more devices, domain name information for at least one domain name that the one or more devices are allowed to access; and wherein, if the PCRF determines that the domain name is allowed for that device with that service profile, the packet data analyzer associates the at least one domain name with one or more internet protocol (IP) addresses; monitors the at least one domain for change in the one or more IP addresses for that domain; and updates the one or more IP addresses of the domain name if any change in the one or more IP addresses for that domain is found.

In an embodiment, the computer program product for traffic flow control using domain name for one or more devices enabled for connectivity over cellular or wireless networks, having computer readable instructions for causing a computer to control an execution of an application for traffic flow control using domain name for one or more devices enabled for connectivity including receiving device information for the one or more devices; receiving domain name information for at least one domain name that the one or more devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

BRIEF DESCRIPTION OF THE DRAWINGS

FIG. 5A illustrates an exemplary system 500 and process for automated traffic flow control using domain name for one or more devices enabled for connectivity over cellular or wireless network in accordance with an embodiment of the present invention.

DETAILED DESCRIPTION

Figure 1:
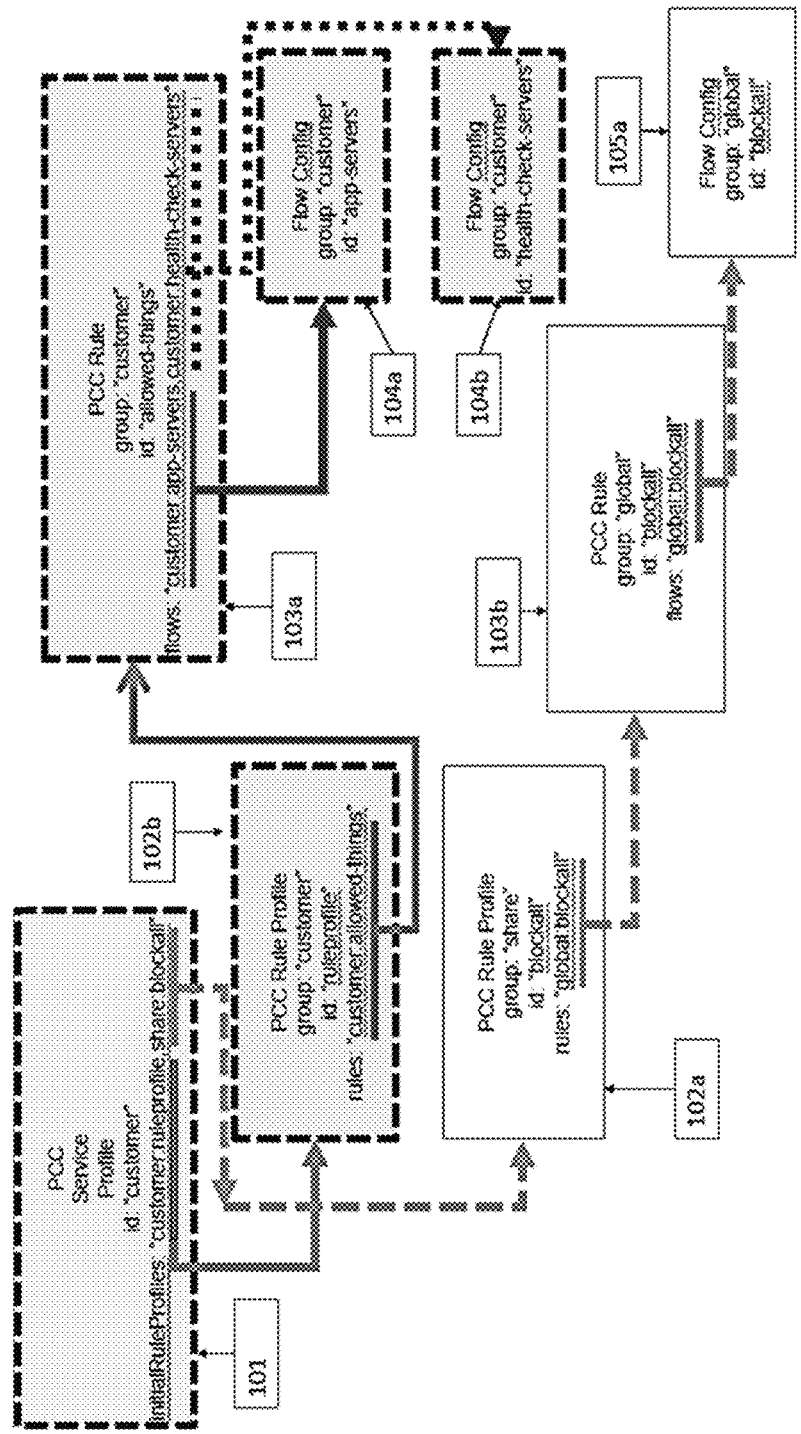
FIG. 1 illustrates an exemplary system 100 and process used for automated traffic flow control using domain name for one or more devices enabled for connectivity over cellular or wireless network in accordance with one or more embodiments of the present invention.

The present invention relates generally to controlling flow of traffic using domain names for devices using cellular or wireless connectivity.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to a product including a connectivity module such as a Subscriber Identification Module (SIM), as used herein the term "product" is intended to be inclusive, interchangeable, and/or synonymous with telematics equipment, sensors, appliances, electronic modules, telephony equipment and other similar products that are enabled for connectivity to wireless or cellular networks and that require registration for that product of distinct identifying numbers, such as Integrated Circuit Card Identifiers (ICCIDs), International Mobile Subscriber Identities (IMSIs), Mobile Equipment Identifiers (MEIDs) or other serial numbers as described further below and collectively referred to herein as "numbers", with a service provider to receive services, one will recognize that functionally different types of products may have characteristics, functions and/or operations which may be specific to their individual capabilities and/or deployment.

An increasing number of devices, whether telematics equipment, sensors, tablets, phones or other types of hardware, known as M2M or Internet of Things (IoT) devices, are enabled to connect to networks, such as wireless or cellular networks, for sending or receiving data by use of such products such as Subscriber Identification Modules (SIMs). As IoT solutions are being deployed in high volume, and as concerns for the security of IoT solutions is increasing, the need and demand to limit the IP addresses that the IoT devices can access on the network is becoming stronger.

One approach to limit the IP addresses that the IoT devices can access is to define a custom Access Point Name (APN) and policies at the Packet Gateway (P-GW) of a cellular network. A downside of this approach is that allowing access to each unique set of IP addresses requires a new APN and policies; defining these APNs and policies requires effort on the part of the operator of the P-GW and involves risk of misconfiguring the P-GW. An alternate approach is to employ a firewall between the P-GW and the Internet where the firewall can be configured with rules to match a cellular device's assigned IP address and the IP addresses that the cellular device is allowed to reach and/or access.

However, because each firewall rule would need to identify the cellular device it applies to, and because the sets of allowed IP addresses for each of the number of cellular devices on the network may be different, there may need to be thousands or millions of rules in the firewall at any time. Additionally, the network operator may assign IP addresses to cellular devices dynamically, such that, for example, a given cellular device may have one IP address when it establishes a packet data session at one time, and a different IP address when it establishes a packet data session at a different time. In this scenario, a rule for a cellular device in the firewall would have to be uninstalled, deactivated, or removed when that cellular device terminates its packet data session, in order for the network operator to safely re-assign the same IP address to another cellular device. Constantly adding and removing rules to the firewall would form an impressive overhead on the operation of the firewall.

An alternate approach is to use the entities specified by the Third Generation Partnership Project (3GPP). These entities are the Policy and Charging Rule Function (PCRF) and Policy and Charging Enforcement Function (PCEF). 3GPP technical specification 29.212 defines how the PCRF can specify, for each cellular device, what IP addresses the cellular device is and is not allowed to access, effectively forming a whitelist and blacklist of IP addresses. The PCEF then enforces the whitelist and blacklist. The PCEF may be implemented as a subsystem of the P-GW (LTE networks) or GGSN (GSM and WCDMA networks). Using the PCRF and PCEF functionalities in a cellular network lowers the operational effort and risk to the operator of the network.

With the proper mechanism for storing the mapping of what cellular device is allowed to access what IP addresses, the operator of the network can even allow their customers to specify their own "whitelisted" (allowed) IP addresses through, for example, a web portal.

However, consider the case where a cellular device communicates with a service running on a host with an IP address, and that the cellular device has been allowed to access that IP address. If the service stops running on that first host, and starts running on a second host with a second IP address, the cellular device will need to be allowed to access that second IP address. Whitelisting or blacklisting a domain name, rather than specific IP addresses, may provide a simpler and better solution, because it introduces a level of indirection: the operator of a cellular device may configure the cellular device to determine the IP address of the service with which it needs to communicate by using the Domain Name System (DNS), and the PCRF may determine what IP address to whitelist or blacklist by also using DNS. However, as the IP addresses associated with a specific domain name may change over time, the possibility of errors in the application of these rules increases.

Generally, the PCRF is designed to control access of and actions by IoT devices based on their service profile. For example, the PCRF can allow packet data transmission, cause a packet data session to drop, assign a charging code to traffic, and/or apply a Quality of Service policy. These actions are similar to the actions firewalls may take. Another rule that can be enforced by the PCRF is whitelisting or blacklisting traffic. Whitelisting may include: allowing a device to communicate with a limited set of IP addresses or ports only, and denying everything else. For example, devices intended for specific use and not for general access to the Internet could be assigned a service profile limiting endpoints that can be reached, enforced through the PCRF, that would prevent workers from accessing anything but work websites, or that would require a temperature sensor to send data to only one IP address. Blacklisting traffic may include: preventing a device from accessing a specified set of IP addresses or ports and allowing everything else, or blocking 128.0.0.0/1 and allowing everything else. A PCRF can be configured to apply special traffic charging rules to devices having a specific service profile, such as applying specific rules for specific scenarios, for example, not counting data packets associated with traffic to or from a specific IP address against a subscriber's data plan.

However, basing whitelisting or blacklisting rule functions on specific IP addresses is not well suited for situations where the whitelisted endpoint is a web site or web application, as many websites use external resources and subdomains, and learning and applying additional filter rules for access to such sites' external resources, subdomains, etc. could potentially require a lot of work. Furthermore, the IP addresses associated with whitelisted endpoints frequently change. Updating IP addresses manually is cost-prohibitive and may produce results that are error prone.

The application of 3GPP technical spec. 29.212 (Policy and Charging Control (PCC) over Gx reference point) is capable of whitelisting the IP addresses (or ranges of addresses) reachable by a cellular device, and blacklisting any other IP addresses not whitelisted. The cellular device will be able to communicate with the whitelisted IP addresses, and will not be allowed to communicate with the blacklisted IP addresses. This whitelisting (a Connection Lock) is most appropriate in the following exemplary situations where the customer's application needs to talk to a small set of IP addresses and these IP addresses do not change, there is concern that a hacker could attempt to take over the device and cause it to send traffic to a new IP address, or there is customer concern that the SIM will be removed from the intended device and used for general purpose Internet access, resulting in unplanned and undesirable usage charges.

The Policy and Charging Rules Function (PCRF) and Policy and Charging Enforcement Function (PCEF) are two different functional entities which may or may not be part of the same computer program product. For example, a network operator could write a program that fulfils the functionality of both creating policies and enforcing them, but it would be monolithic, or the network operator could write different programs wherein one fulfils the functionality of creating policies and another fulfils the functionality of enforcing them. In an exemplary implementation, the PCRF communicates over a computer network to the PCEF what policy, for example, blacklisting, whitelisting, etc., should be applied to a certain cellular device.

The network provider may implement the PCRF to store in a database a service profile for a set of cellular devices, which service profile lists the IP addresses to be whitelisted or blacklisted for those devices, and configure the PCRF to consult the service profile and the data in this database to determine what actions to take and rules to apply for each IP packet observed by the PCRF as being from or to one such cellular device. If the service profile permits access to an IP address or range of IP addresses, those IP addresses are said to be whitelisted.

To reduce unwanted data billing and to mitigate security issues, customers may want to limit the Internet destinations with which customer devices can communicate to a specific set of whitelisted destinations. Currently, that can be done via Virtual Private Network (VPN) integration or IP-address-based whitelisting through a service profile stored in and applied by the PCRF. However, managing VPNs can require resources, and IP-address-based whitelisting through the PCRF may not be flexible enough. In addition, personnel entering permitted destinations in a service profile must know the exact numeric IP addresses for those destinations, which both introduces the opportunity for error on manual entry and makes review of policy rules less intuitive, since the numeric IP addresses do not visually display the name of a permitted or prohibited destination. Whitelisting based on hostname, such as a Uniform Resource Locator (URL) web address, may provide additional flexibility and simplicity.

To enable traffic control through use of a domain name, the service profile of a device stored in the PCRF can list either the domain name, the numeric IP address associated with that device, or both, of the destination to be allowed or denied for that device; the PCRF would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names may frequently change, however, which could result in unsuccessful connection attempts if the IP address associated with a host name in the PCRF, and, by virtue of the rule installation procedure, the PCEF, is no longer correct. The embodiments presented by this invention ensure that the specific numeric IP address or addresses associated with domain names are kept up-to-date.

Installing a sniffer or a packet data analyzer in an environment controlled by the network provider may be used to find out if there has been a change in one or more IP addresses associated with a domain name using domain name system (DNS) look up. The packet data analyzer can be configured automatically to update the allowed (whitelisted) or forbidden (blacklisted) IP address or IP addresses in the service profile for that device in the PCRF. The network operator may host her own DNS servers and direct cellular devices to use those DNS servers through, for example, the Dynamic Host Configuration Protocol (DHCP). The operators of those cellular devices may program the cellular devices to use the DNS servers advertised by the network operator through, for example, DHCP, or any other DNS server reachable by the cellular device. Because the packet data analyzer can intercept and read the DNS lookups of all cellular devices managed by the network operator regardless of the destination of the DNS lookup, the packet data can ensure that the results are correct, for example, the revised whitelisted IP addresses in the PCRF's service profile match the IP addresses that the cellular device will try to reach. Because the network provider's DNS servers would be resistant to common techniques used by malevolent actors trying to trick devices into visiting unwanted IP addresses, such as spoofing or cache poisoning, using the DNS servers could provide additional security.

An embodiment of this invention may include outputs to enable periodic or regular auditing and monitoring by network provider personnel, such as logs.

The embodiments described herein may be used in concert with the DNS server provided by the network operator or another entity as follows, for example,

TABLE 1

Figure 4A:
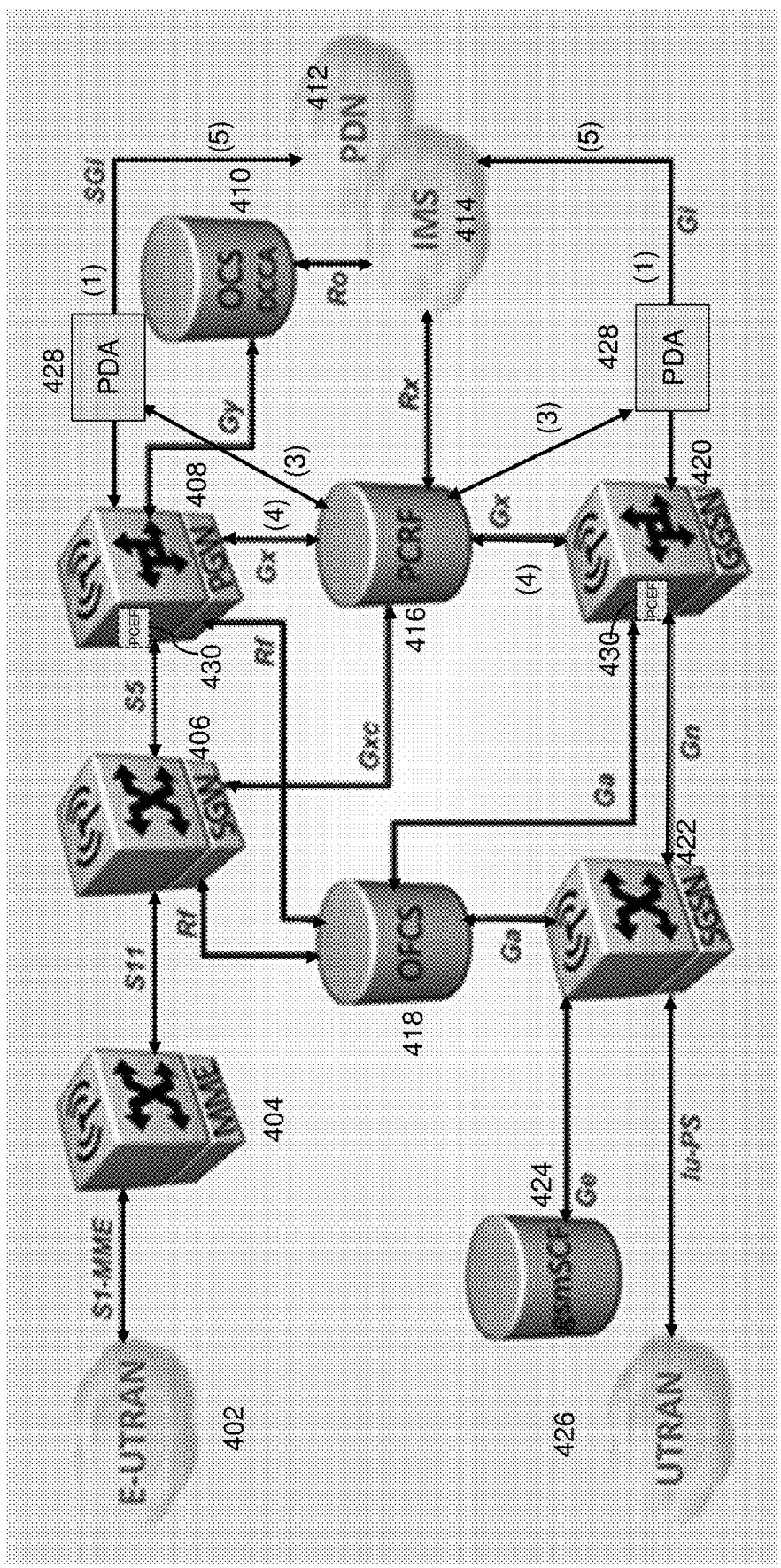
FIG. 4A illustrates an exemplary system 400 and process for automated traffic flow control using domain name for one or more devices enabled for connectivity over cellular or wireless network in accordance with an embodiment of the present invention.
Figure 4B:
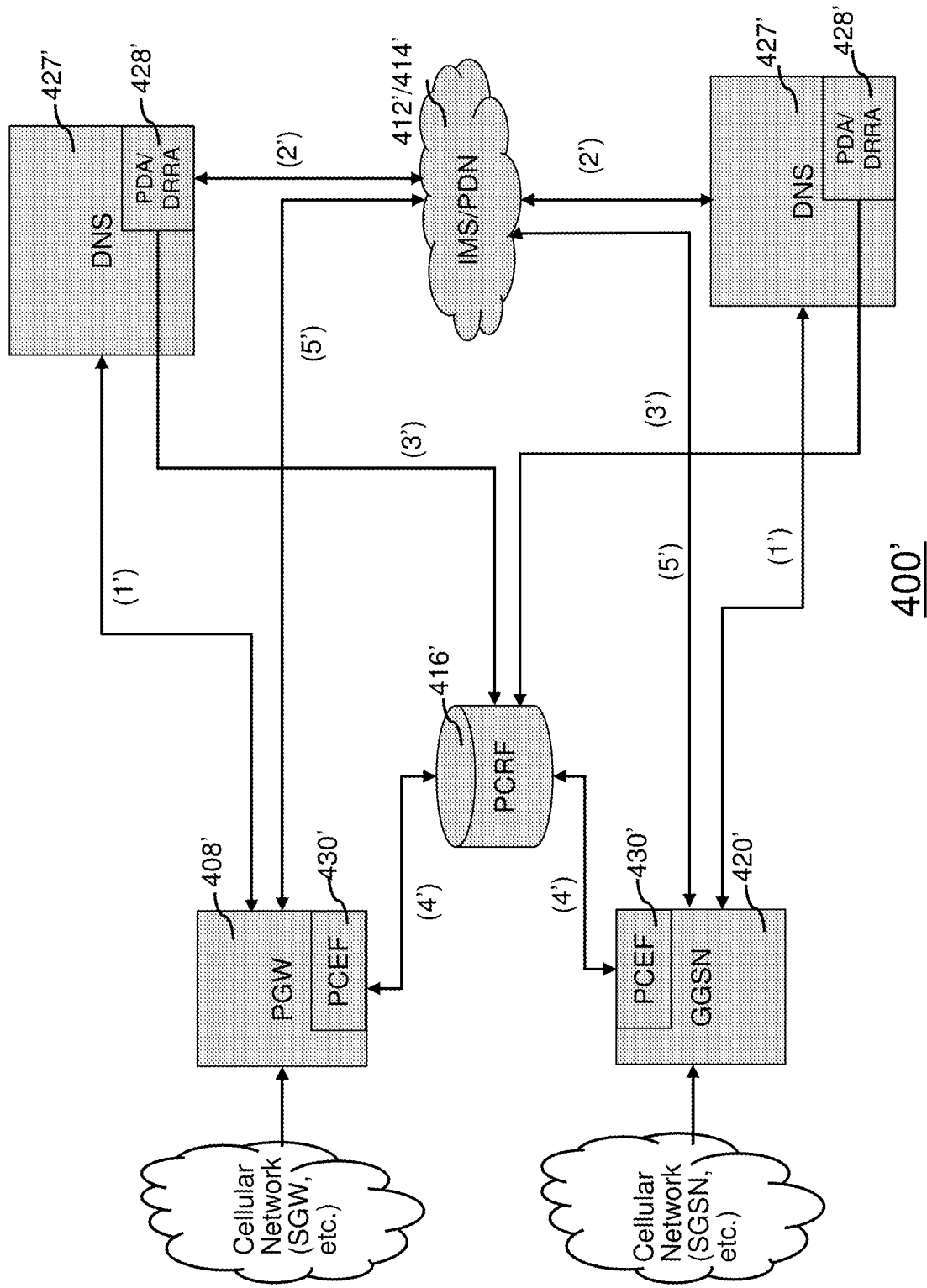
FIG. 4B illustrates an exemplary system 400' and process for automated traffic flow control using domain name for one or more devices enabled for connectivity over cellular or wireless network in accordance with an embodiment of the present invention.

| DNS query destination | DNS queries use encryption | Which embodiments of this invention are effective? |
|---|---|---|
| Network Operator's DNS server | No | Both |
| Network Operator's DNS server | Yes | The network operator's DNS server will be trusted by the subscriber as illustrated by FIG. 4B |

TABLE 1-continued

| DNS query destination | DNS queries use encryption | Which embodiments of this invention are effective? |
| --- | --- | --- |
| Other DNS Server | No | The PDA as illustrated by FIG. 4A would be configured to collect the DNS requests and responses for third party DNS servers |

An exemplary implementation of this invention would incorporate the packet data analyzer into the DNS servers run by the network operator. If the cellular devices use encryption (e.g., DNS-over-TLS or DNS-over-HTTPS) to enhance the confidentiality or integrity of their DNS lookups, the packet data analyzer could take the form of, for example, a function, method, or procedure invoked by the program of the DNS server: whenever the DNS server receives an answer to a DNS query, it can inform the packet data analyzer of the result by invoking the packet data analyzer. If any discrepancy in the IP address or IP addresses associated with a domain name is/are found, the IP address or IP addresses for that domain name is updated automatically and is kept up-to-date in network provider's database so that it is in sync with the actual IP address for that domain name. This continuous update of IP address or IP addresses for a particular domain name will allow the customers to set up whitelists/blacklists based on domain name rather than IP address or IP addresses. As an example, no restrictions may allow traffic to/from any destination; whitelisting <ipchicken.com> and <aeris.com> will allow traffic to <ipchicken.com> and <aeris.com> to pass and block traffic to any other destination; blacklisting <facebook.com> will block traffic to <facebook.com> and allow traffic to any other destination to pass.

To describe the features of the present invention in more detail within the context of IoT devices enabled to connect with wireless or cellular networks with products such as SIMs installed in them, such as telematics devices installed in vehicles or sensors, refer to the accompanying figures in conjunction with the following discussions. These examples are used for purpose of illustration only, and should not be construed as limitations.

The embodiments described herein disclose a computer-implemented method and system for automated traffic flow control using domain name for one or more devices enabled for connectivity over cellular or wireless networks.

A computer-implemented system, method and computer program product for automated traffic flow control using domain name for one or more devices enabled for connectivity over cellular or wireless networks are disclosed.

The computer-implemented method for automated traffic flow control using domain name for one or more devices enabled for connectivity over cellular or wireless networks includes receiving device information for the one or more devices; receiving domain name information for at least one domain name to which the one or more devices is attempting to access, associating the one or more devices with a service profile listing the domain names that such devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

The system for automated traffic flow control using domain name comprises one or more devices enabled for connectivity, a PCRF, and a packet data analyzer, wherein the PCRF receives: device information for the one or more devices, domain name information for at least one domain name which the one or more devices is attempting to access, associating the one or more devices with a service profile stored in the PCRF listing the domain names that the one or more devices are allowed to access; and wherein the packet data analyzer associates the at least one domain name with one or more internet protocol (IP) addresses; monitors the at least one domain for change in the one or more IP addresses for that domain; and updates the one or more IP addresses of the domain name if any change in the IP address for that domain is found.

In an embodiment, the computer program product for traffic flow control using domain name for one or more devices enabled for connectivity over cellular or wireless networks, having computer readable instructions for causing a computer to control an execution of an application for traffic flow control using domain name for one or more devices enabled for connectivity including receiving device information for the one or more devices; receiving domain name information for at least one domain name that the one or more devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

FIG. 1 illustrates an exemplary system 100 and process used for automated traffic flow control using domain name for one or more devices enabled for connectivity in accordance with one or more embodiments of the present invention. In an embodiment, the PCRF entities are linked together by their "group" and "id" fields as shown in FIG. 1. These links function like "foreign keys" in a relational database. When a subscriber requests a data session, the PCRF will follow these linkages to assemble the rules to form the subscriber's traffic rules. The illustration illustrates these linkages. For example, when the PCRF processes the request for a subscriber's data session, it examines the Policy and Charging Control (PCC) Service Profile 101 associated with the subscriber. The PCRF loads from a data store the PCC Rule Profiles 102*a* and 102*b* associated with PCC Service Profile 101; loads from a data store the PCC Rules 103*a* and 103*b* associated with PCC Rule Profiles 102*a* and 102*b*; loads from a data store the Flow Configs 104*a*, 104*b* and 105*a* associated with the PCC Rules 103*a* and 103*b*; creates a charging rule object from the flow information present in the Flow Configs 104*a* and 104*b* and rule information contained in PCC Rule 103*a*; creates a charging rule object from the flow information present in Flow Config 105*a* and PCC Rule 103*b*; and uses these charging rule objects to enforce the configured traffic policy.

Figure 2:
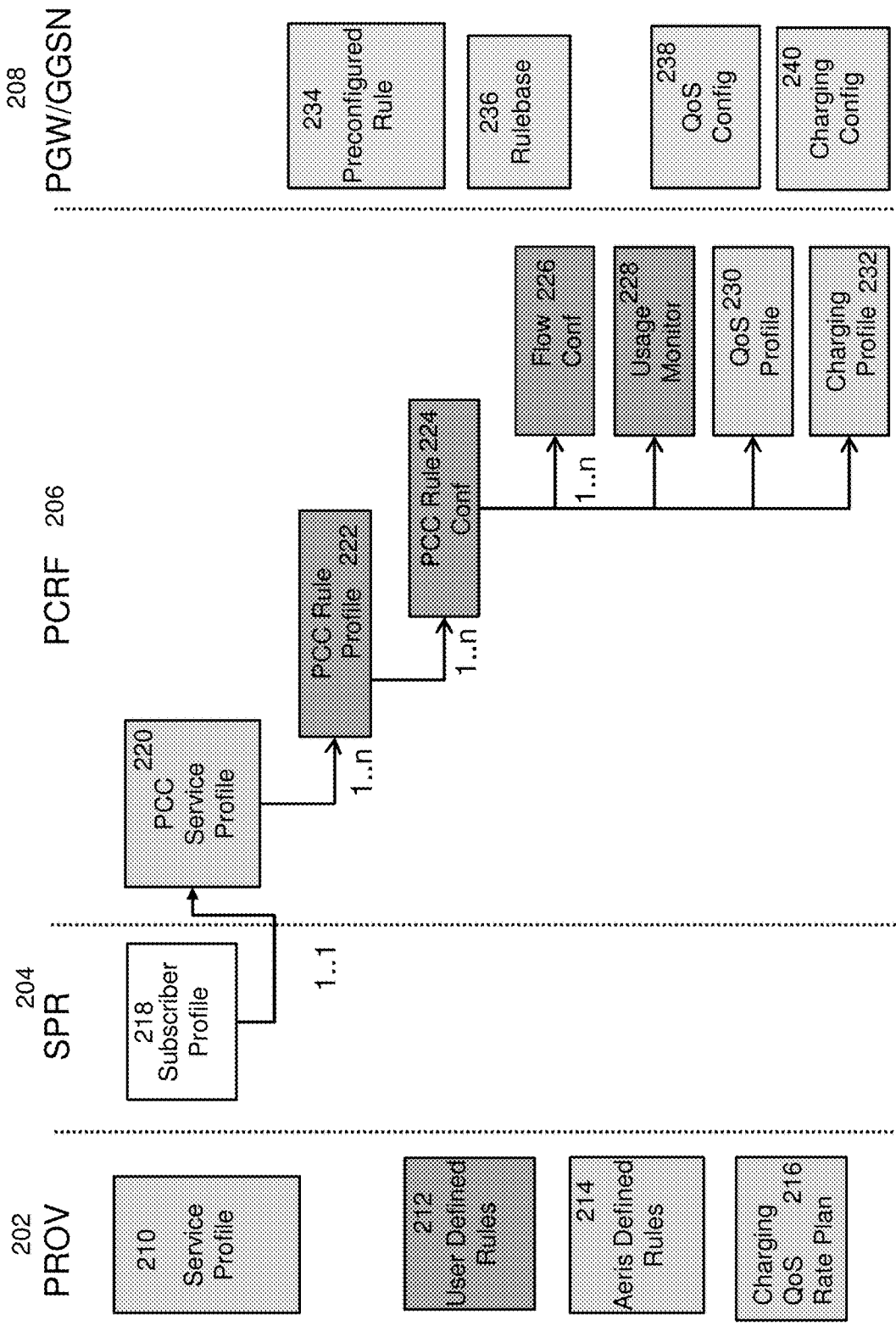
FIG. 2 illustrates an exemplary system 200 and process for automated traffic flow control using domain name for one or more devices enabled for connectivity over cellular or wireless network in accordance with an embodiment of the present invention.

FIG. 2 illustrates an exemplary system and process 200 for automated traffic flow control using domain name for one or more devices enabled for connectivity over cellular or wireless network in accordance with an embodiment of the present invention. In an embodiment, a Policy and Charging Control (PCC) rule 224 consists of: rule name (used as identifier w/ Policy and Charging Rules Enforcement Function (PCEF)), service identifier (identify the service or the service component the service data flow relates to), service data flow filter(s) (select the traffic for which the rule applies), precedence (select rule in case more than one rule applies), gate status (allow/block packet uplink/downlink), QoS parameters (bitrates, allocation/retention, etc.), charging key (i.e. rating group), other charging parameters (online, offline, etc.) and monitoring key (for usage monitoring).

The policy entity or PCRF 206 assembles a Policy and Charging Control rule 224 from objects including PCC Service Profile (service_profile) 220, PCC rule profile (rule_profile) 222, PCC rule configuration (rule_conf) 224, flow configuration (flow_conf) 226, quality of service profile (qos_profile) 230, charging profile (charging_profile) 232, usage monitor (usage_monitor) 228 and subscriber profile (subs_profile) 218. The PCC Service Profile (service_profile) 220 forms a PCC policy including one or more rule profile (rule_profile) objects.

The rule profile (rule_profile) objects form a rule profile which provides what rules will apply and at what time of day they will apply. The rule configuration (rule_conf) 224 provides the actions, e.g., drop traffic, apply charging & QoS & monitoring, etc., that will be taken on a packet if the flow configuration (flow_conf) 226 describes the packet.

The flow configuration (flow_conf) 226 provides how to identify traffic based on packet header information, for example, network and user-equipment IP address, network and user-equipment port, protocol, and direction, e.g., to the User Equipment, from the User Equipment, or both, etc. The quality of service profile (qos_profile) 230 provides Quality of Service attributes such as maximum bitrate, guaranteed bitrate, qos class, etc.

The charging profile (charging_profile) 232 describes how this service flow, e.g., the traffic categorized by the flow configuration (flow_confs) 226, gets charged (for example, when the PCEF gets a packet, the information that goes in the charging records sent to the offline charging system (OfCS) or online charging system (OCS) systems).

The usage monitor (usage_monitor) 228 defines monitoring information for a device's traffic and subscriber profile (subs_profile) 218 maps a PCC policy to a user equipment (UE). Out of these, generally service profile (service_profile) 220, rule profile (rule_profile) 220, rule configuration (rule_conf) 224, flow configuration (flow_conf) 226 and subscriber profile (subs_profile) 218 are used for blacklisting/whitelisting IP addresses and/or ports.

The Policy and Charging Rules Function (PCRF) 206 and Policy and Charging Enforcement Function (PCEF) are two different functional entities which may or may not be part of the same computer program product. In an exemplary implementation, the PCRF 206 communicates over a computer network to the PCEF what policy (blacklisting, whitelisting, etc.) should be applied to a certain cellular device. The PCEF may be implemented as a sub-module of PCRF 206 or as a sub-module of PGW (LTE networks) or (GSM and WCDMA networks) 208.

A person skilled in the art may understand that although a number of examples of filters and/or attributes for creating groups are provided herein, various other attributes may be used for creation of groups based on various attributes.

Figure 3:
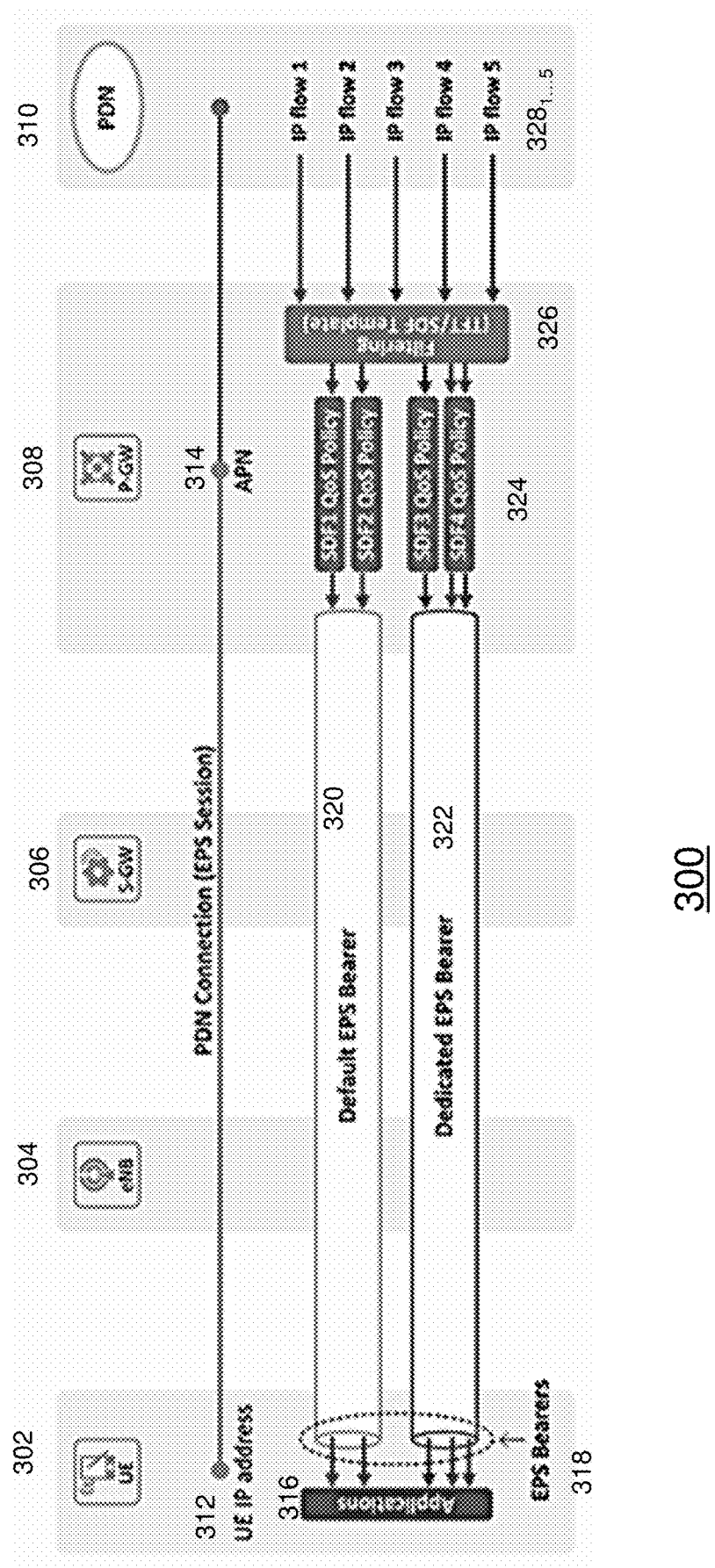
FIG. 3 illustrates an exemplary system 300 and process for automated traffic flow control using domain name for one or more devices enabled for connectivity over cellular or wireless network in accordance with an embodiment of the present invention.

FIG. 3 illustrates an exemplary system and process 300 for automated traffic flow control using domain name for one or more devices enabled for connectivity over cellular or wireless network in accordance with an embodiment of the present invention. In an embodiment, traffic is matched for categorization, assigned a Quality of Service policy 324, and delivered to a User Equipment 302 via an EPS bearer 318.

FIG. 4A illustrates an exemplary system and process 400 for automated traffic flow control using domain name for one or more devices enabled for connectivity over cellular or wireless network in accordance with an embodiment of the present invention.

As illustrated in FIG. 4A, packet data originates from subscribers in an E-UTRAN 402 or UTRAN 426 cellular network, passes through a Serving Gateway (SGW) 406 and Packet Gateway (PGW) 408 (LTE networks) or Service GPRS Support Node (SGSN) 422 and Gateway GPRS Support Node (GGSN) 420 (GSM and WCDMA networks) on its way to a Packet Distribution Network (PDN) 412, and are analyzed by a Packet Data Analyzer (428), which can monitor the packet data from the subscribers by, for example, port mirroring on the network between the PGW 408, GGSN 420, and PDN 412 via step (1). The packet data is also monitored by the Policy and Charging Enforcement Function (PCEF) 430, which is commonly implemented as a sub-module of the PGW 408 (LTE networks) or GGSN 420 (GSM and WCDMA networks), for compliance against installed policy and charging rules.

When the Packet Data Analyzer (PDA) 428 detects a Domain Name System (DNS) request and response for a particular cellular subscriber, the Packet Data Analyzer (PDA) 428 can notify the Policy and Charging Rule Function (PCRF) 416 about the mapping of domain name to IP address via step (3), and the PCRF 416 can notify the PCEF 430 via step (4) of updated policy and charging rules to allow or disallow packet data to or from the IP addresses found in the DNS response. The additional entities Online Charging System (OCS) 410, GSM Service Control Function (gsmSCF) 424, and Offline Charging System (OfCS) 418 are illustrated for reference only. Step (5) is provided to illustrate traffic of cellular subscribers that is not DNS requests to or responses from the network operator's DNS server 427, not shown here as the PDA 428 would capture the DNS requests to any DNS server.

The packet data analyzer (PDA) 428 may be installed in and/or work in concert with PCRF 416 or packet data gateway (PGW) 408 (LTE networks) or GGSN 420 (GSM and WCDMA networks).

To enable traffic control through use of a domain name, the service profile of a device stored in the PCRF 416 can list either the domain name, the numeric IP address associated with that device, or both, of the destination; the PCRF 416 would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names frequently change, however, which could result in unsuccessful connection attempts if the IP address associated with a host name in the PCRF 416 (and, by virtue of the rule installation procedure, the PCEF 430) is no longer correct. The embodiments presented by this invention can ensure that the specific numeric IP address associated with domain names are kept up-to-date.

Therefore, as illustrated by FIG. 4A, the packet data analyzer is "wiretapping" the network link(s) that carry the DNS requests and responses.

In an embodiment, illustrated by FIG. 4B and described below, the packet data analyzer is part of the system, for example, the network operator's DNS sever(s), that receives DNS requests from subscribers and sends DNS responses back to subscribers. Thus, the difference between FIG. 4A and FIG. 4B is in where the packet data analyzer is in relation to the DNS requests and responses.

FIG. 4B illustrates an exemplary system 400' and process for automated traffic flow control using domain name for one or more devices enabled for connectivity over cellular or wireless network in accordance with an embodiment of the present invention.

As illustrated in FIG. 4B, in an embodiment, the system 400' may include the protocol data analyzer 428' as a packet data analyzer (PDA) or as a DNS request and response analyzer (DRRA), as a subcomponent of the DNS server 427' operated by the network operator. DNS queries from cellular devices are directed to the DNS server 427' by the network operator via step (1'). The DNS server 427' will answer the DNS query, for example, by sending a query to the appropriate authoritative name server via (2'), and once the DNS server 427' receives the answer, the DNS server 427' will invoke the protocol data analyzer 428' with the response. Methods for invoking the protocol data analyzer 428' may include, but are not limited to, calling a function or placing a message on a message bus. The information received by the protocol data analyzer 428' may include but not limited to packet data and/or computer readable representations of DNS requests and responses, for example, a C struct, a Java object etc., although a person skilled in the art may realize that other implementations achieving the similar functionality may also be used.

The protocol data analyzer 428' will send updates to the IP addresses of domain names are communicated to the PCRF 416' via step (3'). The PCRF 416' will then update charging rules installed in the PCEF 430' with the updated IP addresses via step (4'). This is different from FIG. 4A in that the protocol data analyzer 428' does not monitor and parse network traffic directly in order to monitor the mapping of domain name to IP address, but instead is given that information by the DNS server 427', which needs to be able to parse DNS requests and responses as a matter of its functionality. Step (5') is provided to illustrate traffic of cellular subscribers that is not DNS requests to or responses from the network operator's DNS server 427'.

FIG. 5A illustrates an exemplary system and process 500 for automated traffic flow control using domain name for one or more devices enabled for connectivity over cellular or wireless network in accordance with an embodiment of the present invention. In this exemplary system, a customer of a cellular network service provider uses their administration system 512 (which could be human administrators aided by, for example, a computer program) to transfer traffic rules 514 to the Internet-Facing Management System 516, which could be, for example, a REST API. This is illustrated by step (1) in the FIG. 5A.

The Internet-Facing Management System transfers the customer traffic rules to the Internal Provisioning System 518, via step (2) which verifies and adjusts the customer traffic rules according to the policies of the cellular network service provider and stores the adjusted and verified traffic policy 520 into a data storage mechanism for Policy and Charging Control (PCC) 522. This is step (3) in the figure.

Additionally, the customer of the cellular network service provider may request the Internet-Facing Management to associate or provision one or more of the customer's cellular subscribers with the customer traffic rules; this association is stored in the a data storage mechanism, the Subscriber Profile Registry (SPR) 524. These steps comprise the "policy provisioning phase" of the exemplary system.

When a cellular subscriber 502 of the customer establishes a packet data session on a cellular network (including, but not limited to, an eNodeB 504 and Serving Gateway (SGW) 506), the Policy and Charging Enforcement Function (PCEF) 509 of the Packet Gateway (PGW) 508 of the cellular network service provider communicates with the Policy and Charging Rule Function (PCRF) 528 of the cellular network service provider by sending a Credit-Control Request 530 message containing, but not limited to, the International Mobile Subscriber Identifier 532 of the cellular subscriber. This is step (4) in the figure.

The PCRF 528 retrieves the subscriber's traffic policy 526 from the PCC 522 and SPR 524 data storage mechanisms. This is step (5) in the figure. The PCRF 528 then uses the subscriber's traffic policy to construct a Credit-Control Answer (CCA) message 534, which contains a set of PCC-Rules (536) representing the subscriber's traffic policy 526, and sends the CCA 534 back to the PGW 508. This is step (6) in the figure.

Once the subscriber's data session is established, the PCEF 509 as part of the PGW 508 will enforce the subscriber's traffic policy on packets that pass between the subscriber and the Packet Distribution Network 510. The PCC-Rules provided by the PCRF 528 to the PGW 508 in the CCA 536 are said to be "installed" in the PGW 508. These steps comprise the "device attachment phase" of the exemplary system.

As illustrated in FIG. 5A, in an embodiment, the packet data analyzer (PDA) 537 of system 500 may passively listen (for example, using a span port on a router) to DNS queries and responses (DNS traffic) of cellular subscribers 502 as the DNS traffic is routed from the PGW 508 and Packet Data Network 510. This is step (7) in the figure. Upon discovery that a monitored domain name has changed IP address or IP addresses, the packet data analyzer updates the records in the PCC database 522. This is step (8) in the figure. The PCRF 528 may be notified of this update (for example, through a database trigger or message bus). This is step (9) in the figure. The PCRF 528 may send a Re-Auth-Request (RAR) message 538 to the PGW containing any revised PCC rules 539. This is step (10) in the figure. These steps form the "device in service phase" of the exemplary system.

Figure 5B:
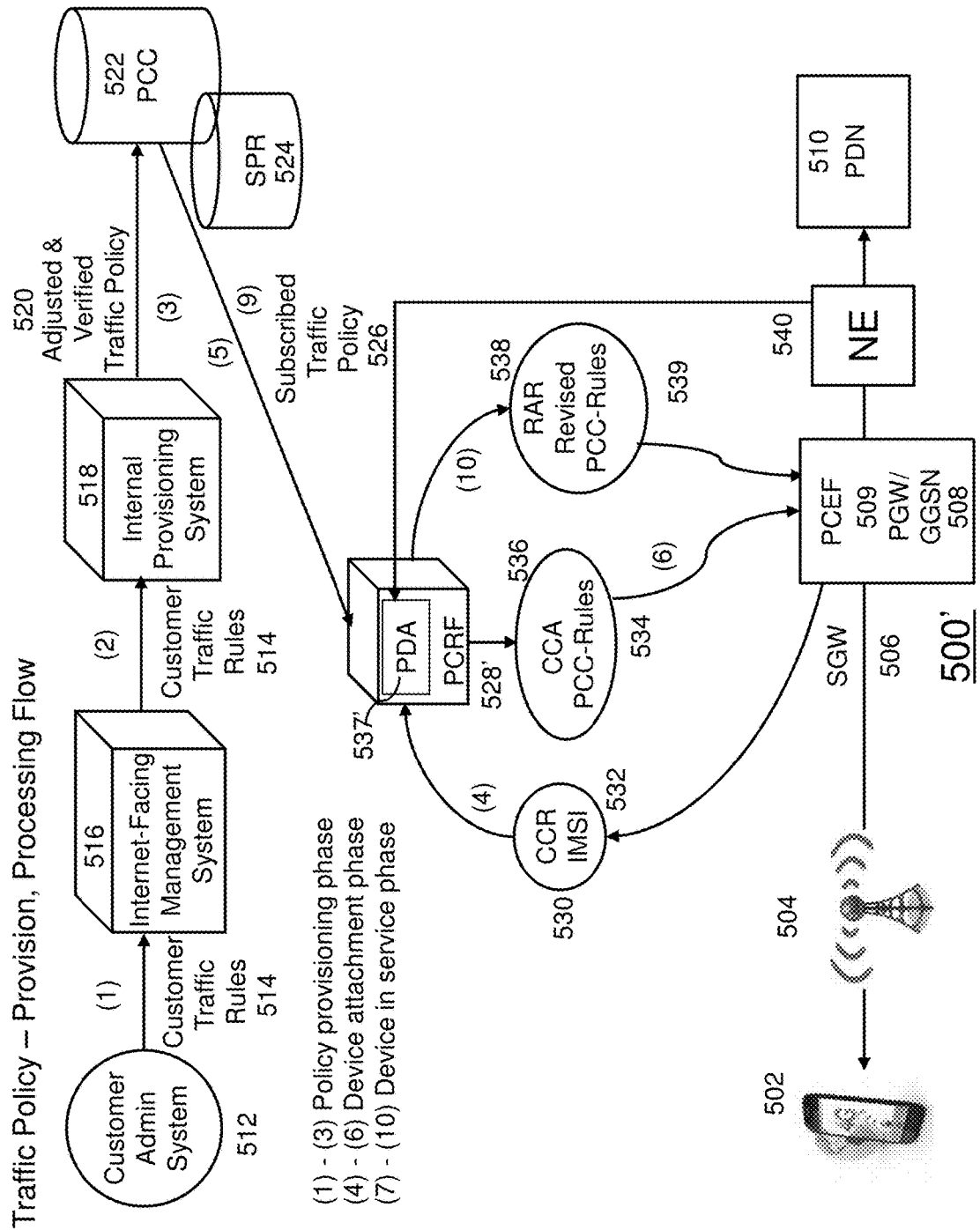
FIG. 5B illustrates an exemplary system 500' and process for automated traffic flow control using domain name for one or more devices enabled for connectivity over cellular or wireless network in accordance with an embodiment of the present invention.

In another embodiment, as illustrated in FIG. 5B, a sniffer or a packet data analyzer (PDA) 537' may be installed, for example, in PCRF 528', which is an environment controlled by the network provider. As illustrated in FIG. 5B, the DNS requests and responses may be forwarded to the PDA via a network element NE 540, for example, a span port and a firewall rule or a span port and a packet capture tool such as tcpdump etc., where PDA 537' analyzes the DNS traffic to monitor changes in IP address or IP addresses for the domain name. All the other components and their working is the same as illustrated in FIG. 5A and described in the description accompanying FIG. 5A. Thus, the packet data analyzer (PDA) 537' may be installed in and/or work in concert with PCRF 528' as illustrated in FIG. 5B or PGW 508 (LTE networks) or GGSN (GSM and WCDMA networks) as illustrated in FIG. 5A.

To enable traffic control through use of a domain name, the service profile of a device stored in the PCRF 528' can list either the domain name, the numeric IP address, or both of the destination to be allowed or denied for that device; the PCRF 528' would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names frequently change, however, which could result in unsuccessful connection attempts if the IP address associated with a host name in the PCRF 528'

(and, by virtue of the rule installation procedure in steps 4, 5, and 6, the PCEF 509') is no longer correct. The embodiments presented by this invention can ensure that the specific numeric IP address associated with domain names are kept up-to-date.

Figure 6:
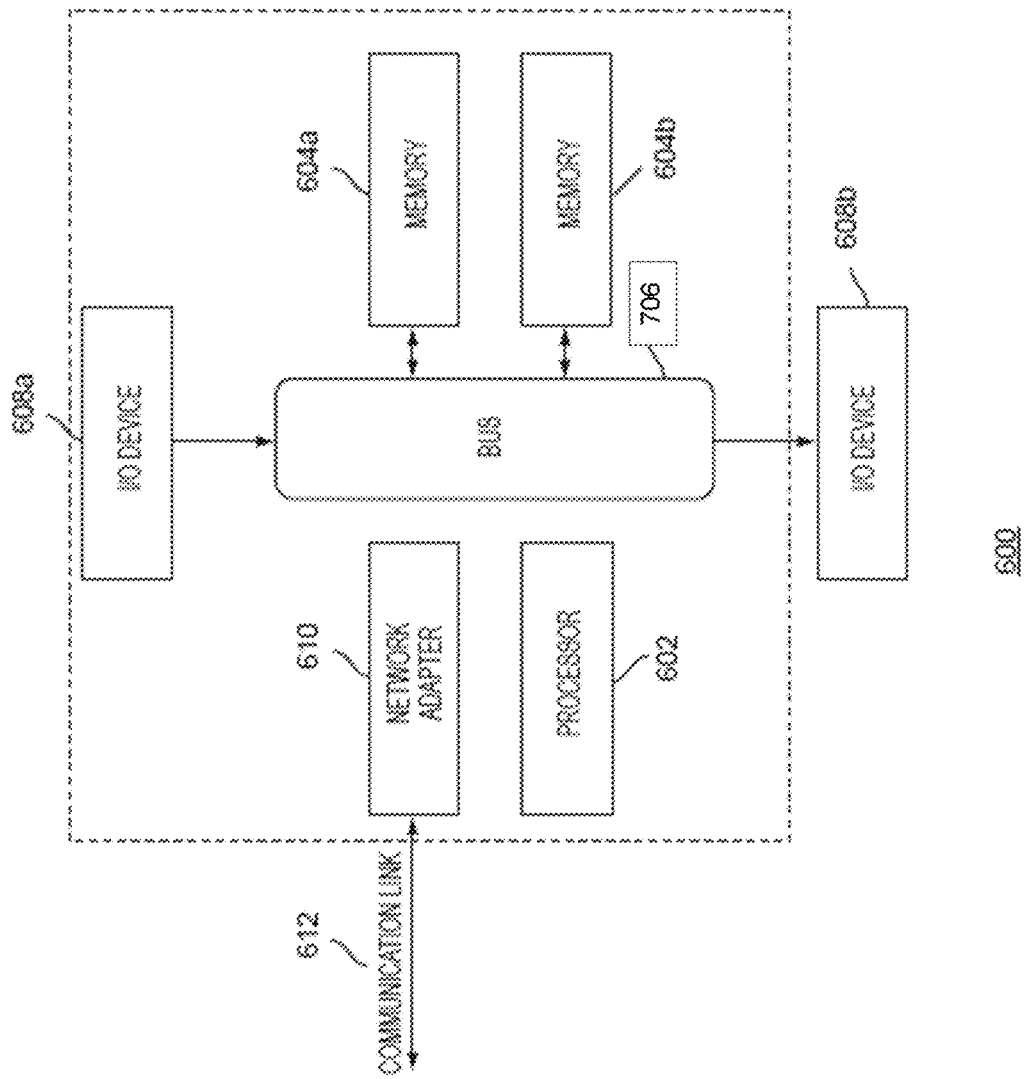
FIG. 6 illustrates a data processing system 600 suitable for storing the computer program product and/or executing program code relating to automated secure device registration and provisioning of one or more devices enabled for connectivity over cellular or wireless network in accordance with one or more embodiments of the present invention.

FIG. 6 illustrates a data processing system 600 suitable for storing the computer program product and/or executing program code in accordance with an embodiment of the present invention. The data processing system 600 includes a processor 602 coupled to memory elements 604a-b through a system bus 606. In an embodiment, the data processing system 600 may include more than one processor and each processor may be coupled directly or indirectly to one or more memory elements through a system bus.

Memory elements 604a-b can include local memory employed during actual execution of the program code, bulk storage, and cache memories that provide temporary storage of at least some program code in order to reduce the number of times the code must be retrieved from bulk storage during execution. As shown, input/output or I/O devices 608a-b (including, but not limited to, keyboards, displays, pointing devices, etc.) are coupled to the data processing system 600. I/O devices 608a-b may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for automated traffic flow control using domain name for one or more devices enabled for connectivity comprises:
  receiving device information for the one or more devices;
  receiving domain name information for at least one domain name that the one or more devices are allowed to access;
  associating the at least one domain name with one or more internet protocol (IP) addresses;
  monitoring the at least one domain for change in the one or more IP addresses for that domain, wherein monitoring the at least one domain for change in the one or more IP addresses for that domain further includes determining if there has been a change in the one or more IP addresses associated with a domain name using domain name system (DNS) look up and automatically updating the one or more IP addresses in the service profile for the one or more devices in the policy and charging rules function (PCRF); and
  updating the one or more IP address of the domain name if any change in the IP addresses for that domain is found.

2. The method of claim 1, wherein the device information includes one or more of: device identifier, make and model of the device and international mobile equipment identity (IMEI), International mobile subscriber identity (IMSI).

3. The method of claim 1, wherein the device includes one or more IoT devices enabled to connect with wireless or cellular networks with products such as SIMs installed in them.

4. The method of claim 1 further comprising notifying policy and charging rule enforcement function (PCEF) of a change in the service profile for the one or more devices in the PCRF when there is a change to the IP one or more addresses of the domain name in the database.

5. The method of claim 4 further comprising enforcing the policy and charging rules sent to the PCEF by the PCRF.

6. A system for automated traffic flow control using domain name for one or more devices enabled for connectivity over cellular network comprises one or more devices enabled for connectivity, a policy and charging rules function (PCRF), a protocol data analyzer and a database,
wherein the PCRF receives:
device information for the one or more devices,
domain name information for at least one domain name that the one or more devices are allowed to access; and
wherein the protocol data analyzer associates the at least one domain name with one or more internet protocol (IP) addresses;
monitors the at least one domain for change in the one or more IP addresses for that domain, wherein monitoring the at least one domain for change in the one or more IP addresses for that domain further includes determining if there has been a change in the one or more IP addresses associated with a domain name using domain name system (DNS) look up and automatically updating the one or more IP addresses in the service profile for the one or more devices in the policy and charging rules function (PCRF); and
updates the one or more IP addresses of the domain name in the database if any change in the one or more IP addresses for that domain is found.

7. The system of claim 6, wherein the device information includes one or more of: device identifier, make and model of the device and international mobile equipment identity (IMEI), International mobile subscriber identity (IMSI).

8. The system of claim 6, wherein the device includes one or more IoT devices enabled to connect with wireless or cellular networks with products such as SIMs installed in them.

9. The system of claim 6, further including a policy and charging rule enforcement function (PCEF), wherein the PCEF enforces the policy and charging rules sent to the PCEF by the PCRF.

10. The system of claim 9, wherein the PCRF notifies the PCEF of the change in the service profile for the one or more devices in the PCRF when there is a change to the one or more IP addresses of the domain name in the database.

11. The system of claim 6, wherein the protocol data analyzer comprises any of: a packet data analyzer or a DNS request and response analyzer.

12. A computer program product stored on a non-transitory computer readable medium for automated traffic flow control using domain name for one or more devices enabled for connectivity, comprising computer readable instructions for causing a computer to control an execution of an application for automated traffic flow control using domain name for one or more devices enabled for connectivity comprising:
receiving device information for the one or more devices;
receiving domain name information for at least one domain name that the one or more devices are allowed to access;
associating the at least one domain name with one or more internet protocol (IP) addresses;
monitoring the at least one domain for change in the one or more IP addresses for that domain, wherein monitoring the at least one domain for change in the one or more IP addresses for that domain further includes determining if there has been a change in the one or more IP addresses associated with a domain name using domain name system (DNS) look up and automatically updating the one or more IP addresses in the service profile for the one or more devices in the policy and charging rules function (PCRF); and
updating the one or more IP addresses of the domain name if any change in the one or more IP addresses for that domain is found.

13. The computer program product of claim 12, wherein the device information includes one or more of: device identifier, make and model of the device and international mobile equipment identity (IMEI), International mobile subscriber identity (IMSI).

14. The computer program product of claim 12, wherein the device includes one or more IoT devices enabled to connect with wireless or cellular networks with products such as SIMs installed in them.

15. The computer program product of claim 12 further comprising instructions for notifying policy and charging rule enforcement function (PCEF) of a change in the service profile for the one or more devices in the PCRF when there is a change to the one or more IP addresses of the domain name in the database.

16. The computer program product of claim 15 further comprising instructions for the PCEF to enforce the policy and charging rules sent to the PCEF by the PCRF.

* * * * *